United States Patent [19]

Dureigne et al.

[11] Patent Number: 4,670,792
[45] Date of Patent: Jun. 2, 1987

[54] METHOD AND DEVICE FOR RECREATION OF AN ANALOG LUMINANCE SIGNAL FROM A DIGITAL SIGNAL

[75] Inventors: Bernard Dureigne, Chevilly Larue; Stéphane Guérillot; Alain Regnault, both of Paris, all of France

[73] Assignee: Agence France Presse, Paris, France

[21] Appl. No.: 376,192

[22] Filed: May 7, 1982

[30] Foreign Application Priority Data

May 8, 1981 [FR] France .................................. 81 09240
Jul. 9, 1981 [FR] France .................................. 81 13482

[51] Int. Cl.$^4$ .............................................. H04N 1/40
[52] U.S. Cl. ........................................ 358/280; 358/138
[58] Field of Search .................... 358/280, 133, 138

[56] References Cited

U.S. PATENT DOCUMENTS

| | | | |
|---|---|---|---|
| 4,280,144 | 7/1981 | Bacon | 358/138 |
| 4,349,846 | 9/1982 | Sekigawa | 358/280 |
| 4,366,506 | 12/1982 | Ejiri | 358/280 |
| 4,389,677 | 6/1983 | Rushby | 358/280 |
| 4,402,015 | 8/1983 | Yamada | 358/280 |
| 4,402,016 | 8/1983 | Muller | 358/280 |

*Primary Examiner*—Howard W. Britton
*Attorney, Agent, or Firm*—Scully, Scott, Murphy & Presser

[57] ABSTRACT

The present invention concerns a process for the recreation of an analog luminance signal from a digital signal used for transmission after analog digital conversion of a luminance signal representative of a document to be transmitted, consisting in taking into consideration, before or after the D−A conversion of the reception, a number P of successive pixels P−2, P−1, P, P+1, p+2 and, as a function of their relative and absolute amplitudes, in processing the central pixel P, breaking it down into m sub-pixels having densities that are a function of those of the surrounding pixels. The present invention notably applies to the digital transmission of iconographic documents transmitted and received by a method of the "Belin" type.

22 Claims, 7 Drawing Figures

METHOD AND DEVICE FOR RECREATION OF AN ANALOG LUMINANCE SIGNAL FROM A DIGITAL SIGNAL

The present invention relates to a method of deductive processing a posteriori, to recreate an analog luminance signal from a digital signal used for transmission, which was derived from an analog/digital conversion of a luminance signal representative of a document to be transmitted.

The subject invention applies more particularly, but not exclusively, to the digital transmission of iconographic documents transmitted and received by a method of the "Belin" type, assisted by the addition of analog-digital and digital-analog conversion circuits.

It is recalled that in "Belin" type methods of transmission used heretofore, the document to be transmitted is wrapped, without overlapping, on a cylinder driven with a rotary movement, and a reader (photosensitive cell, photomultiplier tube, etc.) integral with a platen moving on an axis parallel to the axis of the cylinder, detects the light reflected from the illuminated document at the focal length of the reader.

In an analogous fashion, on reception, the document is reproduced on a sensitive medium supported by a cylinder driven with a rotary movement, by means of a printout device moving on an axis parallel to the axis of the cylinder, and controlled by the analog signal detected at the output of the transmission line.

More precisely, when the transmission of the signal along the line is digital, at the transmitting end, the analog signal representing the document to be transmitted is a luminance signal modulating a carrier in amplitude or frequency modulation. The bandpass of this analog signal is then limited by the photoelectric cell of the reader and by the resolution of the transmitters. It should be noted that this bandpass can be limited to 800 Hz without giving rise to serious alteration and degradation of the signal (a filtering of the signal processed at 800 Hz does not give rise to any visible deterioration in the quality of the images received).

The luminance signal, after demodulation, is analyzed at a frequency f that remains a function of the rapidity of modulation used ($\phi$) and of the number of quantizing bits (n) according to the formula:

$$f = \phi/n$$

for example with $\phi = 4,800$ bauds or 9,600 bauds and $n = 4$ or 5 bits.

This frequency f represents the sampling frequency which, according to Shannon's theorem, is too low when working at 4,800 bauds with a number of bits greater than 4. The reconstituted signal would, in this case, show serious distortions, but this does not take into consideration the characteristics inherent in the luminance signal.

Take, for example, a photo to be transmitted which is constituted by parallel lines which are, in fact, a continuous succession of points or pixels.

The number of points is a direct function of the bandpass, since it is limited by the resolution of the transmitters (this number is eual to twice the bandpass).

Thus in one revolution per second of the transmitting cylinder, there is a definition of about 1,600 points, while in 2 revolutions per second it is restricted to 800 points.

When the processing means ($\phi$ and n) have been selected, the sampling frequency is defined by $f = \phi/n$. The data of the problem are fixed, and it is well to process the luminance signal so that it may be analyzed, stored, transmitted and reconstituted without apparent alteration.

When the photo is transmitted at the rate of the 1 revolution per second, each line is analyzed with an increment, in other words there is a definition of 960 points or pixels (with $\phi = 4,800$ bauds and $n = 5$ bits).

The number of points corresponds to the number of samples per revolution of the cylinder, and is therefore equal to f divided by the number of revolutions per second. Since the line has a certain length (for example $L = 200$ mm), it is possible to compute the interval separating each point (for example $L/f = 0.21$ mm) and from this to deduce that the details, which will be less fine, can be (this being a matter of probability) omitted in the reconstituted photo. Moreover, it is worth noting that the fineness obtained is better than that obtained by 2-revolutions-per-second analog devices.

The problem is much more difficult for photos transmitted at a rate of 2 revolutions per second. Since the sampling frequency remains unchanged, there is a fineness of 960 points, but this time for the analysis of two lines, hence 480 points per line, which is clearly inadequate since the details escaping analysis have a maximum dimension greater than 0.4 mm.

The reconstituted image will have a coarse-featured mosaic appearance since each pixel will, of course, occupy a small rectangle approximately 0.43 mm long of constant density.

A first solution is to integrate the pixels before the sampling, and hence between two quantizations (A-D conversion). As described in patent application No. FR 81,09240 of May 8, 1981, in the name of Applicant, the mean density of the pixel has to be computed, and this average value is transmitted digitally (after quantization).

When a microprocessor is used, the latter, taking, for example, samples at the selected base frequency (4,800 or 9,600 Hz), the latter being coherent relative to Shannon's theorem, will compute the average value of the samples forming the pixel, quantize this average, and transmit it after a linear-to-logarithmic conversion.

This method has the enormous advantage of bringing out the finest details present, and doing so implicitly, in the transmitted signal, even though their value was compressed by the integration. The factor of probability and chance has thus been eliminated.

A second solution consists in the application of a varitable signal processing at the receiving end of the system. Remember that the bandpass of the analog signal can be reduced to 800 Hz, and that, in the most unfavorable case, (2 revolutions per second), there are 480 samples per line and hence 480 pixels.

In order to eliminate the mosaic effect, the signal must therefore be processed at the receiving end. This processing can be in an analog mode, hence after D-A conversion, or in a digital mode before conversion.

The major defects which must be additionally remedied are four in number:

(1) Deterioration of sharp transitions of the analog signal for substantial differences in amplitude, hence for the limits between contrasted zones.

(2) Fine details that have been eliminated in processing at the transmission end, but which exist by implication.

(3) The effect of zone contours in the course of color ranges, these contours being encountered in the passage from one level of quantization to an adjacent level.

(4) The annoying mosaic effect.

The object of the present invention, therefore, is to find a solution which will eliminate these defects. With this in mind, the subject invention is based on the fact that the most important characteristic of the analog luminance signal (on transmission) is the time of rise, tm (risetime) (10%–90%) which, in the case of rotation of the cylinder at 2 revolutions per second is about 550 us (in 1 revolution per second it is greater than tm 700 us).

On the basis of this characteristic, when comparing the analog signal and the signal after digitization, it can be deduced that during the time of integration of a pixel, there can be no more than two intersections of the analog signal with its average value.

The invention makes use of this property which, in contrast to other processing methods, where there is anticipation, authorizes a deductive processing at the receiving end, that is to say an a posteriori—processing, not a predictive method.

The advantage of this method is the avoidance of the use of complex and troublesome memories and, since each pixel is quantified as a unit, and since, in conjunction, the transmission is synchronous, it assures almost complete immunity to parasitc disturbences.

It must be remembered that the receiving part of the device also comprises the reverse function of linear-logarithmic conversion as mentioned above.

Thus, in order to recreate the sharp transitions of the analog signal, a method according to the present invention consists in taking into consideration, before or after the D-A conversion and preferably before the log-lin conversion, at the receiving end, with p successive pixels and, as a function of their relative and absolute amplitudes, in processing the central pixel by breaking it down into m "sub-pixels" which are accorded weights (hence densities) that are a function of those of the surrounding pixels.

With this in mind, the average value of the density of the initial pixel to be processed can be retained, and be redistributed over the corresponding pixels recreated, according to the formula:

$$C = \frac{\sum_{j=1}^{m} Cj}{m}$$

in which:
C represents the absolute amplitude of the central pixel to be processed,
Cj represents the amplitude of the sub-pixels created,
m represents the number of sub-pixels.

In this way it is possible to refine the size of the pixel and create intermediate levels of quantization. This method therefore, simultaneously solves the aforementioned mosaic and zone contour problems.

More precisely, and according to a first embodiment of the invention, the number of pixels taken into consideration is at least equal to three, namely pixel P to be processed, the preceding pixel P−1 and the following pixel P+1, pixel P forming a quantization gap x relative to pixel P−1 and a quantization gap y relative to pixel P+1.

The quantization of the sub-pixels created for the processing of pixel P is then as follows:

If the product x·y is equal to zero, the values of the amplitudes Cj of the sub-pixels are unchanged and remain equal to the absolute amplitude P to be processed.

If the product x·y is positive, the values of the amplitudes Cj of the sub-pixels are computed so as to ensure a stepped transition between pixels P−1 and P+1, wherein the slope, determined experimentally, various as a function of the gap between values x and y.

If the product x·y is negative, the values of the amplitudes Cj of the sub-pixels are computed so as to ensure a recreation of fine details by a transition having a maximum or minimum, wherein the form, determined experimentally, varies as a function of the gap between values x and y.

According to a second embodiment of the invention, the number of pixels taken into consideration is equal to five significant pixels, namely pixel P to be processed, preceded by pixels P−1 and P−2 and followed by pixels P+1 and P+2, pixel P forming a quantization gap x relative to pixel P−1 and a quantization gap y relative to pixel P+1, while pixel P−2 forms a quantization gap alpha ($\alpha$) with pixel P−1 and Pixel P+2 a quantization gap beta ($\beta$) with pixel P+1.

The quantization of the sub-pixels created for the processing of pixel P is then as follows:

If the quantization gap x is equal to zero, as in the preceding embodiment, the values of the amplitudes Cj of the sub-pixels are unchanged and remain equal to the absolute amplitude of pixel P to be processed.

If the quantization gap is different from zero, several approaches are possible:

(a) the product x·y is equal to zero.

if beta.x=0 the values of the amplitudes Cj of the sub-pixels are unchanged and remain equal to the absolute amplitude of pixel P to be processed except in the case where the quantization gap |x| is lower than or equal to a predetermined value (for example 1). In this case, the amplitudes Cj will vary according to the linear equation $$Cj = C - \frac{m + 1 - j}{m + 1} x$$

in which
C is the absolute amplitude of pixel P,
j is the number of the sub-pixel,
m is the number of sub-pixels of pixel P.

if beta.x is greater than zero, the values of the amplitudes Cj of the sub-pixels are unchanged and remain equal to the amplitude of pixel P to be processed.

if beta.x is less than zero, the values of the amplitudes Cj of the sub-pixels are computed so as to ensure a recreation of fine details for both pixels P and P+1, because this is a case of double points;

(b) if x·y is negative, the values of the amplitudes Cj of the sub-pixels are computed so as to ensure a recreation of fine details for pixel P, and, where the case applies, for pixels P and P+1;

(c) if x·y is positive, the values of the amplitudes Cj of the sub-pixels are computed so as to ensure a stepped transition between P−1 and P+1 as mentioned above.

It is worth noting that for reasons of simplification in the clocks, the number of sub-pixels m can be advantageously selected to be equal to the number of quantization bits n. Furthermore, in an operative system, the number m must be greater than or equal to 3 (m≧3).

There are, however, certain cases which it is impossible to process conveniently. These cases are limited to small variations in the analog signal, but at high frequencies (greater than 480 hz for 2 revolutions, and 960 Hz for 1 revolution). It was noted that on a classic image, the exceptional cases are very rare and that the processing produces no supplementary deterioration in comparison with an unprocessed signal.

Another object of the invention is the application of the method described above to a device for the recreation, after digital transmission of an analog signal such as, for example, the signal coming from a Belin type analyzer, this system comprising:

(a) At the transmitting device:

A linear-logarithmic converter receiving the demodulated analog signal.

A unit formed by two integrators in parallel at the outlet of the converter, and operating alternately, this unit allowing the integration of the entirety of the luminance signal delivered by each pixel.

A analog-digital converter connected to the outlet of the unit through a blocking sampler designed to store the signal furnished by either of the two integrators for the time necessary for the analog-digital conversion relative to each pixel, and A parallel-series interface to serialize the digital signal representing the value of each of the pixels, and transmit it to a multiplexer and/or a modem over the transmission line in accordance with prevailing standards.

(b) At the receiving part.

A series-parallel converter receiving the series digital signal emanating from the transmission line.

A digital-analog converter connected to the output of the series-parallel converter.

A logarithm-linear converter to process the signal obtained by the digital-analog converter so as to obtain, at its output, an exponential signal identical to the demodulated analog signal transmitted at the input of the transmitting part, and computing and processing unit applying the method according to the invention, which can be situated before or after the digital-analog converter.

According to another characteristic of the subject invention, the modulated signal furnished by the transmitter is transmitted to the linear-logarithmic converter through a demodulating, white-detecting and leveling circuit, this circuit comprising: in series between the transmitter and the linear-logarithmic converter, a variable-gain amplifier and a full wave rectifier, a switching device being provided between the full wave rectifier, the linear-logarithmic coverter and/or the transmission line.

In this case, the invention provides a circuit acting on the switching device to break the connection between the full wave rectifier and the linear-logarithmic converter in the absence of an emission from the transmitter.

A circuit is also provided to:

detect the presence of a white signal emitted at the start of the transmission;

adjust the gain of the variable-gain amplifier so that the latter will deliver a signal the amplitude of which will be equal to the maximum value that the analogdigital converter can process;

store the signal determining the gain of the amplifier so that this gain will remain identical throughout the transmission, and make the connection between the full wave rectifier and the linear-logarithmic converter when the locking of the amplifier gain is completed.

The transmitting part can also comprise a circuit to generate, after the amplifier gain locking and before the digital processing of the document:

(a) a redundant binary word serving as a synchronization signal to the receiving part so that the latter may recognize the beginning and the end of a binary word quantizing a pixel.

(b) when applicable, a recognition word, generally known as a SECAL which, depending on the code used, will or will not authorize the receiver to receive the message.

In this case, the receiving part can, in turn, comprise:

A circuit for decoding the recognition word which, depending on the code used, will or will not authorize the receiver to receive the signal transmitted by the line.

A synchronization word decoder to transmit a zero reset signal for the clock which clocks the digital-analog converter.

A deductive processing circuit according to the method of the invention, with a circuit installed either after the D-A converter, or before this converter.

Several embodiments of the invention will be described below by way of non-limiting examples, with reference to the attached drawings in which.

Figure 1:
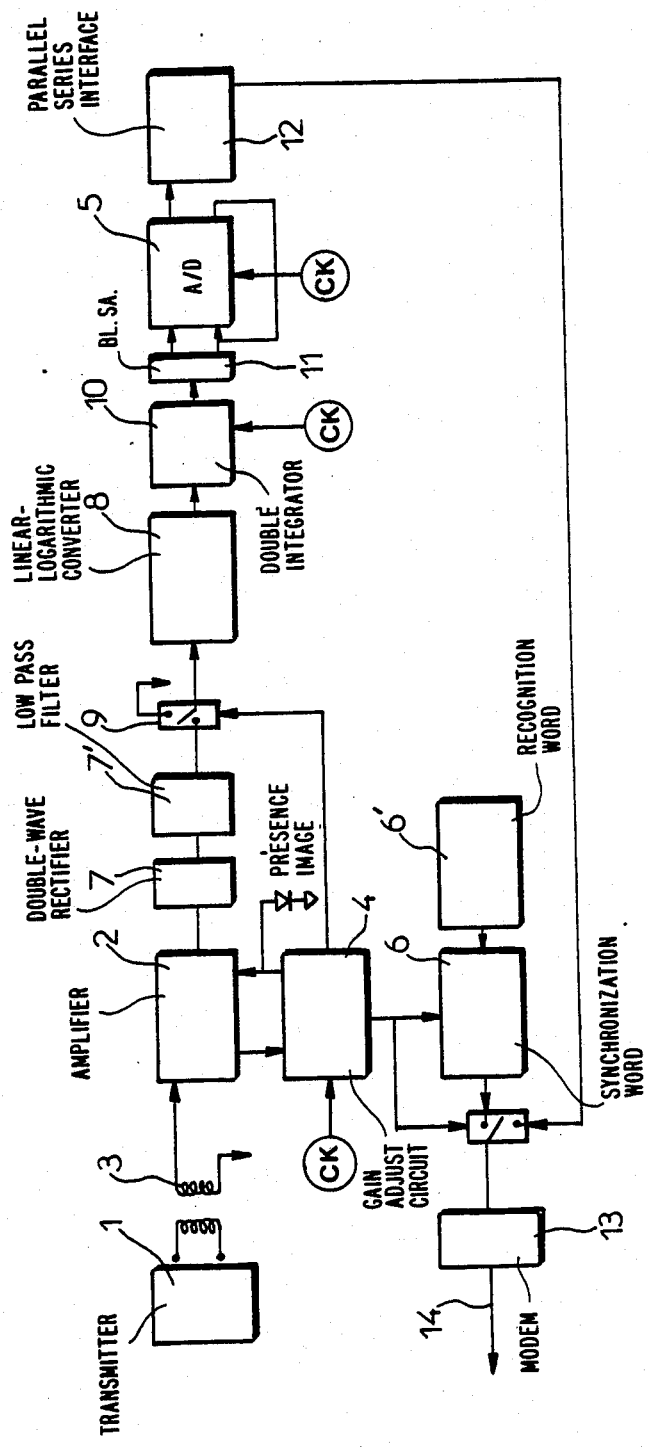
FIGS. 1 and 2 represent, respectively, the block diagrams of the transmitting part and the receiving part of a system for digital transmission of iconographic documents transmitted and received by a Belin-type method.

Referring to FIG. 1, the signal from transmitter 1 (for example an amplitude-modulated 1800 Hz carrier) is applied to the input of a variable-gain amplifier 2 through an isolation transformer 3.

At the end of three seconds of uninterrupted white signal sent by transmitter 1, circuit 4 detects the presence of a transmission start and adjusts the gain of amplifier 2 so that the latter will deliver a signal the amplitude of which is equal to the maximum value that analog-digital converter 5 can process, such that the maximum-amplitude signal corresponding to the "white" delivered by transmitter 1 will indeed correspond to the highest digital value that analog-digital converter 5 may furnish. Nevertheless, if the document reading signal were to present a white amplitude above that determined initially by the white signal, a chopper or amplitude limiter can be provided to align this amplitude with the white level previously established. The signal determining the gain of amplifier 2 is stored so that this gain will remain identical throughout the transmission of the document.

Once this gain locking is obtained, a circuit 6 generates a redundant binary word that serves as a synchronization signal to the receiving part (FIG. 2) so that the latter may recognize the beginning and the end of a binary word quantizing a pixel. The circuit 6' provides a recogniztion word known under the name Secal which, depending on the code used, will or will not authorize the receiver to receive the message. A full wave rectifier 7 is connected to the output of amplifier 2 and to a low pass filter 7' which demodulates the 1800-Hz carrier luminance signal.

The demodulated analog signal furnished by rectifier 7 is transmitted to a linear-logarithmic converter 8 by means of a switching device 9.

The function of this converter 8 is to linearize the luminance signal. As a matter of fact, the latter is linked exponentially to the varying grays, ranging from black to white, of the document. The linearizing of this ratio makes it possible to quantize each pixel with only 5 bits.

The output of converter 8 is coupled to a double integrator 10, each section of which, working alternately, makes it possible to integrate the entire luminance signal delivered by each pixel. This method eliminates the uncertainty of integration caused by the necessary time taken by a single integrator to return to zero before each fresh integration of a pixel luminance signal.

Once this integration, is completed, the signal is transferred to a blocking sampler 11 and stored in this sampler 11 for the time required by the analog-digital converter 5, which follows, to finish its conversion. The digital signal representing the value of the pixel is then serialized by the parallel-series interface 12 and sent from the output of the system toward a multiplexer and/or a modem 13 by means of which line 14 can be employed according to prevailing standards.

In this exemplary embodiment, the clock frequency clocking the analog-digital converter 5 and the parallel-series interface 12, is equal to 4800 Hz, a frequency furnished by transmitting modem 13, divided synchronously by N, N being the number of binary bits making up the binary word quantizing a pixel.

The result, then, is a synchronous transmission of the binary data, that is to say, without supplemental beginning and ending bits.

Figure 2:
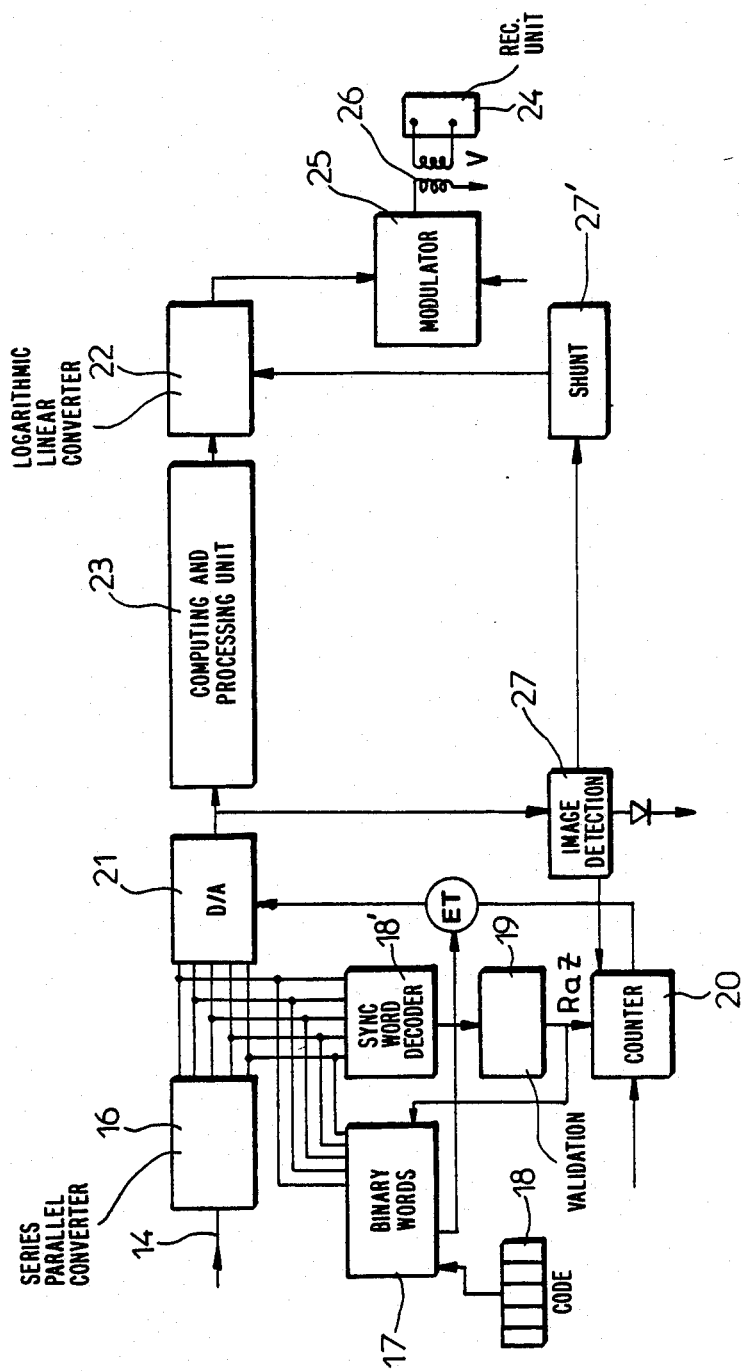

In the receiving part represented in FIG. 2, the series digital signal transmitted by line 14 is applied to the input of a 5-bit series-parallel converter (offset register 16. The signals from this converter 16 are received by a decoder for binary recognition words 17 emitted by block 6 (FIG. 1) which, depending on the code 18 used, will or will not authorize the receiving part to take the document. In parallel, a synchronization word decoder 18' triggers, after validation 19, a signal that is applied to the zero-reset input of a counter 20, a divider-by-five of the clock frequency of modem 13, (4,800 Hz). The output from this counter 20 controls the retrievel by digital-analog converter 21 of the signal present at its inputs. The binary words applied to the digital-analog converter will be taken into consideration synchronously with the binary words generated by the transmitters.

The signal thus obtained is the analog image of the transmitted signal, within the limits of digital reconstruction. This signal is then processed by the logarithmic-linear converter 22, and by a computing and processing unit 23 applying the method according to the present invention. This exponential signal then modulates a carrier, for example, of 1800 Hz, in modulator 25, and the signal is directed toward reconstitution unit 24 by means of an isolation transformer 26. This signal is thus identical to the modulated analog signal delivered by transmitter 1.

In order to avoid interference, which give a watered-silky appearance to the reconstituted document, the modulated 25 is controlled by the clock signal of modem 13.

When the transmitter has completed the analysis of the document, the 1800 Hz signal disappears. At this moment an image detection circuit 27 detects the end of the image and the block 27' shunts the ouput of converter 22 so that the modulation level of circuit 25 is then at −50 dB. The reconstitution unit, taking only a signal above −37 dB, then registers the end of transmission.

It should be noted that in the transmission system described above, the line-by-line reading of the documents can be embodied according to a principle different from the "BELIN" method.

Moreover, an important advantage of the system according to the present invention is that it allows various clock frequencies without disturbing the operation of the system.

In addition, an embodiment of this transmission system can be obtained with a microprocessor.

In this case, the order of the processing operations on the signal is modified as follows:

in the receiving part, all processing operations on the signal will take place before the digital-numerical converter 21;

in the transmitting part, the operations on the signal will take place after the analog-digital converter 5.

It should be noted, first of all, that the diagram was presented to illustrate the fact that, as mentioned above, during the time of integration of a pixel, there can be no more than two intersections of the analog signal (analog source signal z(t) with its average value (digitized signal Z (t).).

It will be recalled in this connection that these two signals satisfy the following formula:

$$Z(t_i) = \int_{t_i}^{t(i+1)} z(t)dt$$

in which $t_i$ represents the instants of sampling and with $t(i+1) - t_i = 1/f$ f being the sampling frequency.

Figure 4:
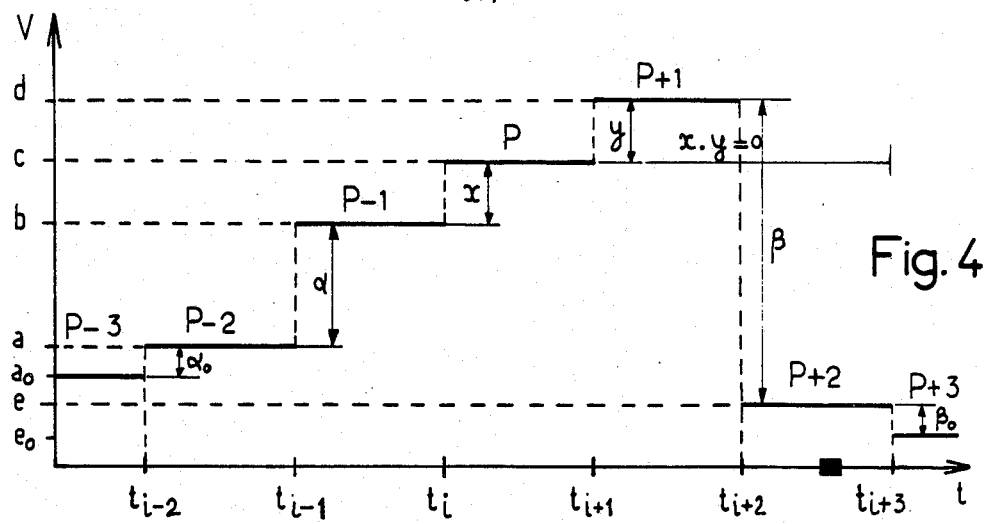
FIG. 4 is a diagram of voltage as a function of the time of a digitized signal, this graph showing the variables.
Figure 5:
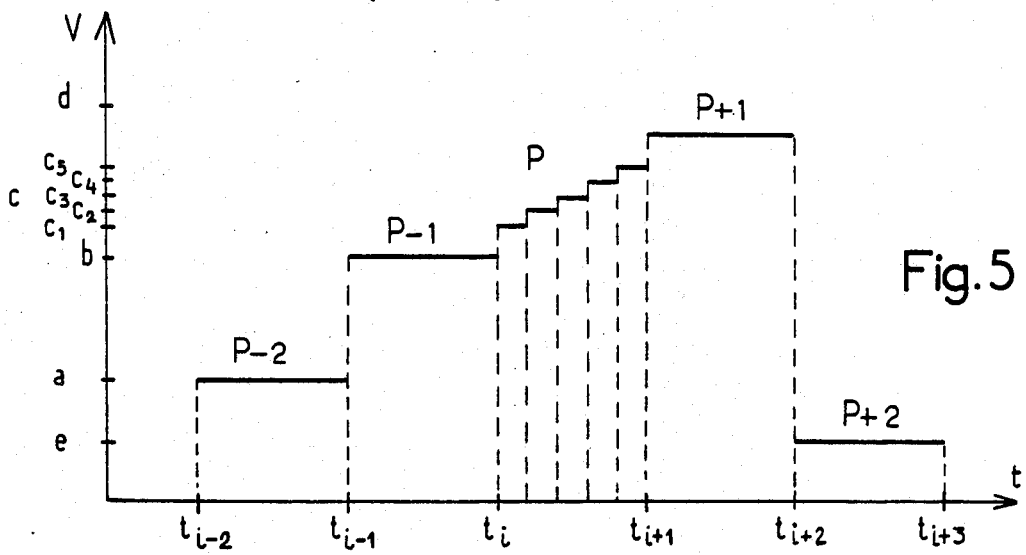
FIG. 5 is a diagram of voltage as a function of the time of a digitized signal in which the central pixel is broken down into subpixels.
Figure 6:
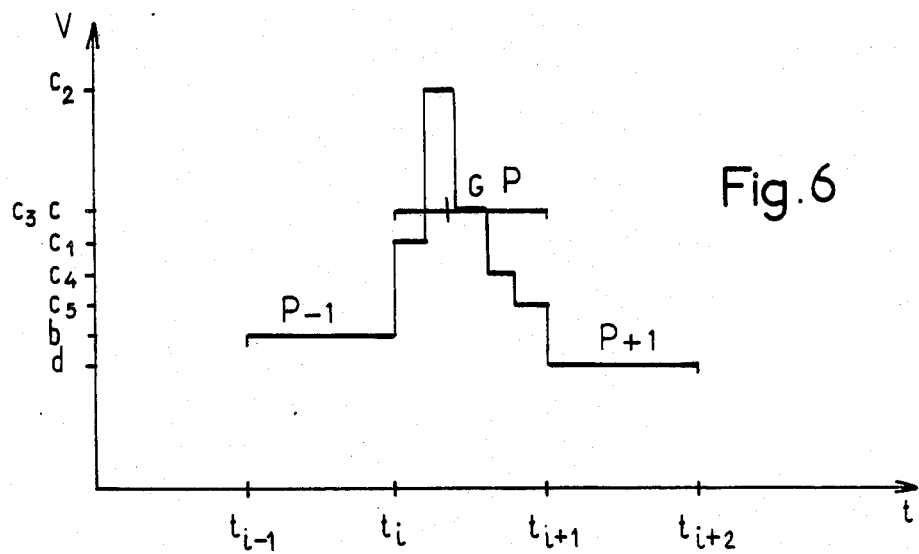
FIG. 6 is a diagram as a function of the time, illustrating the principle of recreation of fine details.
Figure 7:
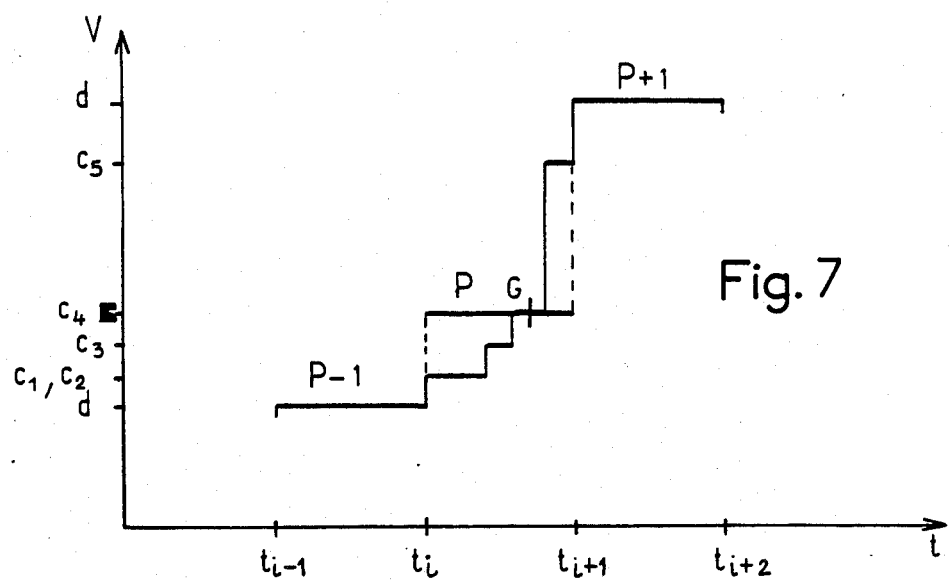
FIG. 7 is a diagram of voltage as a function of the time, illustrating a breakdown into steps.

The number of pixels taken into consideration for the processing of the signal, in FIGS. 4 and 5, was selected equal to be seven, which seems to correspond to the best compromise between the efficiency and complexity of the processing algorithm.

Nevertheless, among these seven pixels P−3, P−2, P−1, P, P+1, P+2, P+3, the most significant pixels are the five central pixels P−2, P−1, P, P+1, P+2, the two end pixels, P−3, P+3 serving only in a limited number of cases.

It should be pointed out that, when reduced to three pixels (P−1, P, P+1), the processing, while more reduced, immediately provides a great improvement in the quality of the reconstituted signal and in the reproduction of the image. In any event, a treatment of this nature is described in the remaining description.

Figure 3:
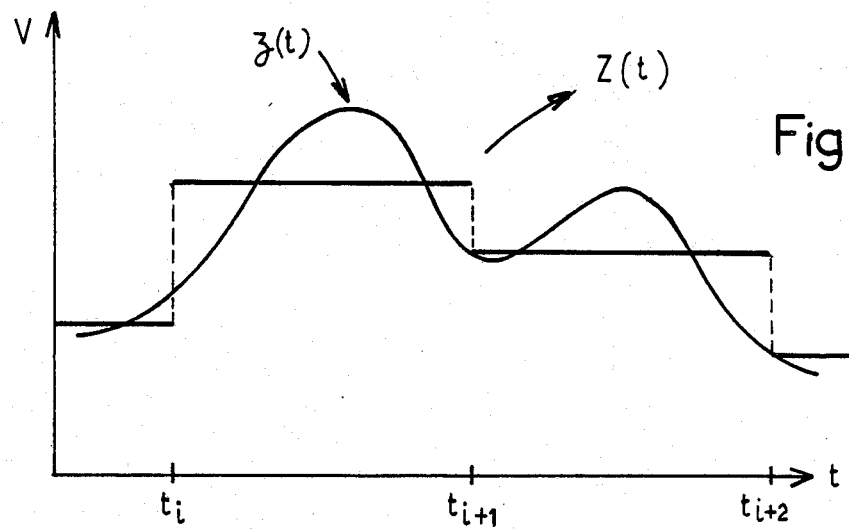
FIG. 3 is a diagram of voltage as a function of the time, of an analog-source signal and of the corresponding digitized signal.

The variables in the processing of the digitized signal represented in FIGS. 2 and 3, are the following:

the base frequency $\phi$ selected for example at 4,800 Hz, the number p of pixels taken into consideration, which is seven, the number m of sub-pixels of the central pixel P which is equal to five, the number n of quantification bits which is taken equal to five, the absolute amplitudes of the pixels taken into consideration, which will be noted in the sequence $a_o$, a, b, c, d, e, $e_o$, the gaps between the levels of quantization, which will be noted $alpha_o$, alpha, x, y, beta, $beta_o$, these gaps satisfying the formulas: $alpha_o = a - a_o$, $alpha = b - a$, $x = c - b$, $y = d - c$, $beta = e - d$, $beta_o = e_o - e$, the amplitude Cj of the 5 sub-pixels created for processing the central pixel P whose absolute amplitude is C, $$Cj = C_1, C_2, C_3, C_4, C_5,$$

ALGORITHM OF PROCESSING ON RECEPTION (A) General principle

It will be noted initially that the gaps x and y will define the type of processing to be applied, while alpha and beta will represent parameters, and $alpha_o$ and $beta_o$ being used only in special cases.

In order to keep the calculated values between the levels corresponding to photo black and photo white, the amplitude C of pixel C of pixel P is used to weight the efficiency of the processing. The latter being repetitive, it should be pointed out that the values taken into consideration at an instant t will be offset by one pixel for the processing corresponding to that of the following instant, wherein:

$$\alpha_{(t+1)} = a_{o(T)};$$

$$x_{(t+1)} = \alpha_{(t)};$$

$$y_{(t+1)} = x_{(t)};$$

$$\beta_{(t+1)} = y_{(t)}.$$

(B) Type of processing depending on the values of the gaps x, y and beta

1. When x=0, no modification is to be made, that is to say that whatever j may be, comprised within the interval [1, 5], there will be the equality: Cj=C.

2. When x is different from zero, the type of processing will vary as a function of the value and the sign of the product x.y and of the product beta.x.

(a) When x.y is equal to 0:

if beta.x=0 there will be no modification to be made unless x=±1, in which case, whatever the value of j comprised in the internal [1, 5], the following formula must be satisfied:

$$Cj = C - \frac{6-j}{6} x,$$

when beta.x>0, no modification will be made, that is to say, whatever the value of j comprised within the interval [1, 5], the equality Cj=C will be present.

when beta.x<0, the processing "recreation of fine details" will then be applied, as described below, in reference to FIG. 4, for the two pixels P and P+1 simultaneously, because this is a case of double points C=d.

(b) When x.y<0, the processing "Recreation of fine details" will be applied for pixel P and, perhaps, in certain cases, for pixels P and P+1.

(c) When x.y>0, a "Breakdown into steps" processing is applied, as described below in reference to FIG. 5, in order to favor the transition between pixels P−1 and P+1.

It is noted therefore that it is sufficient to define two distinct processing operations which are:

The "Recreation of fine details" (x.y<0 and double point).

The "Breakdown into steps" (x.y>0).

(C) Breakdown into steps: (x.y>0)

The five sub-pixels recreated, represent the breakdown of the transition between level b and level d. These sub-levels have values determined by coefficients which are a function of the gaps x, y, alpha, beta. It will be noted that if alpha=0, or beta=0, they are replaced, respectively in the computations by $alpha_o$ and $beta_o$.

Since the processing is iterative, and relates to only one pixel at a time, the passage between pixels represents a logic transition. It was therefore found advisable to define the point corresponding to the passage between two successive pixels. For the processing of pixel P, this point $P_1$ will have the coordinates:

$$P_i(t_i, P_{(bc)}) \text{ with } \begin{cases} P_{(bc)} = C + \epsilon_{(bc)} \\ \epsilon_{(bc)} = -\dfrac{x\,|y|}{|y| + |\alpha|} \end{cases}$$

This point thus corresponds to the best curve passage between pixel P−1 and pixel P.

In like manner, it is possible to define the optimal point of passage for the transition between pixels (c) and (d). With respect to (d), this point $P_{(i+1)}$ will have the coordinates:

$t_{i+1}$ abscissa $$P_{(cd)} \text{ ordinate } \begin{cases} P_{(cd)} = d + \epsilon_{(cd)} \\ \epsilon_{(cd)} = -\dfrac{y\,|\beta|}{|x| + |\beta|} \end{cases}$$

For the processing of pixel P, it is necessary to know the coordinates of this point $P_{i+1}$ relative to P. This simple change of origins is obtained by writing:

$d = c + y$, wherein:

$$P_{i+1}(t_{i+1}, P_{(cd)}) \text{ with } \begin{cases} P_{(cd)} = C + \epsilon'_{(cd)} \\ \epsilon'_{(cd)} = \dfrac{y\,|x|}{|x| + |\beta|} \end{cases}$$

Now that the two values $epsilon'_{(bc)}$ and $epsilon'_{(cd)}$ are known, the variations of the end sub-pixels have been identified and it is possible, as a function of the ratio epsilon (bc)/epsilon'(cd), to determine the amplitude of all the sub-pixels to be recreated. Nevertheless, there are two exceptions in which the values of $C_1$ or $C_5$ deviate from the limits defined by $epsilon_{(bc)}$ and $epsilon'_{(cd)}$.

These cases are determined by the following two tests in which it must be pointed out that if alpha or beta are zero, they will not be replaced by alpha$_o$ or beta$_o$.
if $$\boxed{alpha \cdot x < 0}.$$

epsilon$_{(bc)}$ is replaced by x when the ratio epsilon$_{(ab)}$/epsilon'$_{(bc)}$ is greater than 1.4.
if $$\boxed{y \cdot beta < 0},$$

epsilon'$_{(cd)}$ is replaced by y when the ratio epsilon'$_{(de)}$/epsilon$_{(cd)}$ is greater than 1.4.

It is clear that these substitutions will be made in the calculations and equations below:

By convention,: $\forall$ j$\epsilon$[1,5], $C_j = C + \epsilon_j$ hence:

$$\sum_{j=1}^{5} j=0 \cdot \left| \frac{\epsilon'_{(cd)}}{\epsilon_{(bc)}} \right| \geq 4 \text{ then:}$$

$$\begin{cases} \epsilon_1 = \epsilon_{(bc)} \\ \epsilon_5 = -4\epsilon_{(bc)} \end{cases}$$

$$\epsilon_2 = \epsilon_{bc}; \epsilon_3 = \epsilon_{bc}; \epsilon_4 = \epsilon_{bc} \cdot 4 \geq \left| \frac{\epsilon'_{(cd)}}{\epsilon_{(bc)}} \right| \geq \frac{3}{2} \text{ then:}$$

$$\begin{cases} \epsilon_1 = \epsilon_{(bc)} \\ \epsilon_5 = \epsilon'_{(cd)} \end{cases}$$

$$\epsilon_2 = \frac{1}{10}(6\epsilon_1 - \epsilon_5); \epsilon_3 = -\frac{1}{10}(2\epsilon_1 + 3\epsilon_5);$$

$$\epsilon_4 = -\frac{1}{5}(7\epsilon_1 + 3\epsilon_5) \cdot \frac{3}{2} \geq \left| \frac{\epsilon'_{(cd)}}{\epsilon_{(bc)}} \right| \geq \frac{2}{3}$$

$$\begin{cases} \epsilon_1 = \epsilon_{(bc)} \\ \epsilon_5 = \epsilon'_{(cd)} \end{cases}$$

$$\epsilon_2 = -\frac{1}{2}\epsilon_5; \epsilon_3 = -\frac{1}{2}(\epsilon_1 + \epsilon_5); \epsilon_4 = -\frac{1}{2}\epsilon_1.$$

$$\frac{2}{3} \geq \left| \frac{\epsilon'_{(cd)}}{\epsilon_{(bc)}} \right| \geq \frac{1}{4}$$

$$\begin{cases} \epsilon_1 = \epsilon_{(bc)} \\ \epsilon_5 = \epsilon'_{(cd)} \end{cases}$$

$$\epsilon_2 = -\frac{1}{5}(3\epsilon_1 + 7\epsilon_5); \epsilon_3 = -\frac{1}{5}\left(\frac{3}{2}\epsilon_1 + \epsilon_5\right);$$

$$\epsilon_4 = -\frac{1}{5}\left(\frac{1}{2}\epsilon_1 - 3\epsilon_5\right) \cdot \frac{1}{4} > \left| \frac{\epsilon'_{(cd)}}{\epsilon_{(bc)}} \right|$$

-continued $$\begin{cases} \epsilon_1 = -4\epsilon'_{(cd)} \\ \epsilon_5 = \epsilon'_{(cd)} \end{cases}$$

$$\epsilon_2 = \epsilon'_{(cd)}; \epsilon_3 = \epsilon'_{(cd)}; \epsilon_4 = \epsilon'_{(cd)}.$$

(D) Recreation of fine details (x.y < 0)

For this processing, the same principle as explained above is used, that is the calculation of the coordinates of the optimal points of passage: $P_i$ and $P_{i+1}$.

$$P_i(t_i, P_{(bc)}) \text{ with } \begin{cases} P_{(bc)} = C + \epsilon_{(bc)} \\ \epsilon_{(bc)} = \frac{x|y|}{|y| + |\alpha|} \end{cases}$$

$$P_{i+1}(t_i, P_{(cd)}) \text{ with } \begin{cases} P_{(cd)} = C + \epsilon'_{(cd)} \\ \epsilon'_{(cd)} = \frac{y|x|}{|x| + |\beta|} \end{cases}$$

In the same manner, the amplitude of the subpixels will depend directly on the values epsilon$_{(bc)}$ and epsilon'$_{(cd)}$, but consideration must be given to the absolute amplitude C of pixel P, in order to limit the processing and keep the values of the recreated sub-pixels between the voltage corresponding, respectively, to photo black and photo white (Delta is the coefficient of equilibrium). It should be noted that, as before, it is necessary to add a test on (y.beta) and (x.alpha) and if alpha or beta are zero, they will be replaced in the calculations by alpha$_o$ or beta$_o$ respectively.

if (y.beta < 0), which corresponds, for pixel P+1, to a processing of the "Recreation of fine details" type, the ratio epsilon'$_{(de)}$/epsilon$_{(cd)}$ should be studied in order to locate the maximum of the peak to be recreated.

If this ratio is greater than 1.4, epsilon'$_{(cd)}$ is replaced by y in the following calculations.

if x.alpha < 0), epsilon$_{(bc)}$ will likewise be replaced by −x when the ratio epsilon$_{(ab)}$/epsilon'$_{(bc)}$ will be greater than 1.4.

In all of the calculations below, the Cj quantities will be defined by: $\forall$ j$\epsilon$[1,5] on a $C_j = C + \Delta \epsilon_j$.

The processing, is then carried out as follows:

$$\left| \frac{\epsilon'_{(cd)}}{\epsilon_{(bc)}} \right| > 1,4$$

$$\epsilon_1 = 2\epsilon_{(bc)} - 4\epsilon'_{(cd)}; \epsilon_2 = -2\epsilon_{(bc)} + \epsilon'_{(cd)};$$

$$\epsilon_3 = \epsilon'_{(cd)}; \epsilon_4 = \epsilon'_{(cd)}; \epsilon_5 = \epsilon'_{(cd)} \cdot 1,4 \geq \left| \frac{\epsilon'_{(cd)}}{\epsilon_{(bc)}} \right| > 1,1$$

$$\epsilon_1 = 2\epsilon_{(bc)} - 4\epsilon'_{(cd)}; \epsilon_2 = -3\epsilon_{(bc)} + 2\epsilon'_{(cd)};$$

$$\epsilon_3 = \epsilon_{(bc)}; \epsilon_4 = \epsilon'_{(cd)}; \epsilon_5 = \epsilon'_{(cd)} \cdot 1,1 \geq \left| \frac{\epsilon'_{(cd)}}{\epsilon_{(bc)}} \right| > 1$$

$$\epsilon_1 = \frac{1}{3}\epsilon'_{(bc)}; \epsilon_2 = -2\epsilon'_{(bc)}; \epsilon_3 = 0;$$

-continued $$\epsilon_4 = \frac{2}{3} \epsilon'_{(bc)}; \epsilon_5 = \epsilon'_{(bc)} \cdot \left| \frac{\epsilon'_{(cd)}}{\epsilon_{(bc)}} \right| = 1$$

$$\epsilon_1 = \epsilon'_{(cd)}; \epsilon_2 = 0; 0; \epsilon_3 = -2\epsilon'_{(cd)}; \epsilon_4 = 0; \epsilon_5 = \epsilon'_{(cd)} \cdot$$

$$1 > \left| \frac{\epsilon'_{(cd)}}{\epsilon_{(bc)}} \right| \geq 0.9$$

$$\epsilon_1 = \epsilon_{(bc)}; \epsilon_2 = \frac{2}{3} \epsilon_{(bc)}; \epsilon_3 = 0; \epsilon_4 = -2\epsilon_{(bc)};$$

$$\epsilon_5 = \frac{1}{3} \epsilon_{(bc)} \cdot 0.9 > \left| \frac{\epsilon'_{(cd)}}{\epsilon_{(bc)}} \right| \geq 0.7$$

$$\epsilon_1 = \epsilon_{(bc)}; \epsilon_2 = \epsilon_{(bc)}; \epsilon_3 = \epsilon'_{(cd)};$$

$$\epsilon_4 = 2\epsilon_{(bc)} - 3\epsilon'_{(cd)}; \epsilon_5 = -4\epsilon_{(bc)} + 2\epsilon'_{(cd)} \cdot 0.7 > \left| \frac{\epsilon'_{(cd)}}{\epsilon_{(bc)}} \right|$$

Two possible cases must then be considered: if $$\boxed{y \cdot \text{beta} \leq 0}$$

$$\epsilon_1 = \epsilon_{(bc)}; \epsilon_2 = \epsilon_{(bc)}; \epsilon_3 = \epsilon_{(bc)};$$

$$\epsilon_4 = \frac{1}{3} \epsilon_{(bc)} - 2\epsilon'_{(cd)}; \epsilon_5 = -\frac{10}{3} \epsilon_{(bc)} + 2\epsilon'_{(cd)}.$$

if $$\boxed{y \cdot \text{beta} > 0},$$

the two pixels P and P+1 are treated en bloc. Since pixel P+1 has already been processed beforehand (iterative processing), and since in the present case the computed data are modified, it is necessary, before the output of the data, to have a buffer which contains the values of the five sub-pixels corresponding to the result of the processing of pixel P+1, which values can be erased in the course of the processing of P.

This particular processing of two pixels simultaneously is covered in the following part:

(E) "Recreation of fine details" processing applied simultaneously to two pixel in the case of double points (1) (y≠0)

This processing completes the case above when meeting the condition y.beta>0. The five sub-pixels recreated for pixel (d) will be written:

$$dj = d + \Delta \epsilon dj$$

with $j \in [1,5]$.

To complete the calculation, compute $$\epsilon'_{(de)} = \frac{\beta |y|}{|\beta_o| + |y|} - \text{if} \cdot si |\epsilon'_{(de)}| \leq |y|$$

suivantes:

the epsilon$_{dj}$ quantities will assume the following values:

$$\epsilon_{d1} = -3\epsilon_{(de)};$$

$$\epsilon_{d2} = 0;$$

$$\epsilon_{d3} = \epsilon_{d4} = \epsilon_{d5} = \epsilon'_{(de)}$$

if $|\epsilon'_{(de)}| > |y|$ two cases are to be considered:

(a) (a)$|\epsilon'_{(de)}| + |y| \leq |\epsilon_{(bc)}|$, the epsilon$_{dj}$ quantities will assume the same values as before:

$$\epsilon_{d1} = -3\epsilon'_{(de)};$$

$$\epsilon_{d2} = 0;$$

$$\epsilon_{d3} = \epsilon_{d4} = \epsilon_{d5} = \epsilon'_{(de)}.$$

(b) $|\epsilon'_{(de)}| + |y| > |\epsilon_{(bc)}|$ and epsilon$_{dj}$ quantities are seen to be modified in the same manner as follows:

$$\epsilon_{d1} = -3(\epsilon_{(bc)} - y); \epsilon_{d2} = 0; \epsilon_{d3} = \epsilon_{d4} = \epsilon_{d5} = \epsilon_{(bc)} - y \cdot$$

(2)(y = 0)

(2) (y=0)

The useful reference points are now $P_i(t_i, P_{(bcd)})$ and $P_{i+2}(t_{i+2}, P_{(cde)})$ with:

$$\begin{cases} P_{(bcd)} = C + \epsilon_{(bcd)} \\ \epsilon_{(bcd)} = -\frac{x |\beta|}{|\beta| + |\alpha|} \end{cases} \text{et} \begin{cases} P_{(cde)} = C + \epsilon'_{(cde)} \\ \epsilon'_{(cde)} = \frac{\beta |x|}{|\beta_o| + |x|} \end{cases}$$

because the point $P_{i+1}$ has no reason to exist, with y being zero. Since the point is double, it is hypothesized that the maximum of the peak to be recreated is located in the middle of this large pixel formed by P and P+1. The ten sub-pixels will be noted: $C_1, C_2, C_3, C_4, C_5, d_1, d_2, d_3, d_4, d_5$ with the corresponding epsilon$_j$ and the epsilon$_{dj}$ quantities for $j \in [1,5]$.

Taking epsilon=inf (epsilon$_{(bcd)}$, epsilon'$_{(cde)}$) then:

$$\epsilon_{1C} = \epsilon; \epsilon_{2C} = \epsilon; \epsilon_{3C} = \epsilon; \epsilon_{4C} = 0; \epsilon_{5C} = -3\epsilon$$

$$\epsilon_{1d} = -3\epsilon; \epsilon_{2d} = 0; \epsilon_{3d} = \epsilon; \epsilon_{4d} = \epsilon; \epsilon_{5d} = \epsilon.$$

Note: the coefficient of equilibrium Delta must be calculated, in all of this part of the processing, in relation to the ten sub-pixels, and the same will therefore be true for P and P+1.

CALCULATION OF THE COEFFICIENT OF EQUILIBRIUM DELTA (Δ)

Call M the value corresponding to a photo white, in order to weight the Cj quantities, it is necessary to compute the equilibrium factor Delta.

if x>0, the largest gap epsilon$_j$ is compared with the difference M−C:

sup epsilon$_j$ ≤ M − C, then Delta = 1 j = 1.5 sup epsilon$_j$ > M − C, then Delta = $\frac{M - C}{\text{sup epsilon}_j}$ j = 1.5 if x<0, the larges gap-epsilon$_j$ is compared with C:

sup (−epsilon$_j$) ≤ C, then Delta = 1 j = 1.6

-continued $$\sup(-\text{epsilon}_j) > C, \text{ then Delta} = \frac{C}{\sup(-\text{epsilon}_j)}$$

$j = 1.5$ x.y=0—the values of C are unchanged—$Cj=C$.
x.y>0—table (1)—"transitions."
x.y<0—table (2)—"details."
Processing tables used:

TABLE 1

| $y \geq x$ | $C_1$ | $C_2$ | $C_3$ | $C_4$ | $C_5$ | |
|---|---|---|---|---|---|---|
| $1.5x > y \geq x$ | $C - x/2$ | $C - x/4$ | $C$ | $C + x/4$ | $C + x/2$ | $x \cdot y > 0$ |
| $2.5x > y \geq 1.5x$ | $C - \frac{2}{3}x$ | $C - \frac{1}{3}x$ | $C$ | $C + \frac{1}{3}x$ | $C + \frac{2}{3}x$ | |
| $4x > y \geq 2.5x$ | $C - x/2$ | $C - x/2$ | $C - x/4$ | $C$ | $C + \frac{5}{4}x$ | |
| $6x > y \geq 4x$ | $C - \frac{3}{4}x$ | $C - \frac{1}{2}x$ | $C - \frac{1}{4}x$ | $C$ | $C + \frac{3}{2}x$ | |
| $y \geq 6x$ | $C - x$ | $C - \frac{3}{4}x$ | $C - \frac{1}{2}x$ | $C - \frac{x}{4}$ | $C + \frac{5}{2}$ | |

When x>y it is sufficient to reverse the order of the Ci quantities and replace x by y in Table 1.

TABLE II

| $y > 0, x < 0$ | $C_1$ | $C_2$ | $C_3$ | $C_4$ | $C_5$ | |
|---|---|---|---|---|---|---|
| $-1.2x > y \geq -x$ | $C - x$ | $C$ | $C + 2x$ | $C$ | $C - x$ | $x \cdot y < 0$ |
| $-1.5x > y > -1.2x$ | $C - x/2$ | $C + 2x$ | $C$ | $C - x$ | $C - x$ | |
| $-y \geq -1.5x$ | $C + 3x$ | $C + x$ | $C - x$ | $C - \frac{3}{2}x$ | $C - \frac{3}{2}x$ | |

In conclusion, three remarks can be made:

The domains of application which have served as limits for the study of variations in amplitude of the sub-pixels are the results of experiments and preliminary calculations which take into consideration the fundamental characteristics of an iconographic document. The variations in amplitude of the various sub-pixels have been approximated, in parts, to functions of the first degree, with a view to facilitate processing, whether analog or digital. By modifying the first derivatives of these functions, it is easy to improve the efficiency of the processing, while retaining the same average density value.

The second remark that can be made concerns the immunity to parasitic disturbances. Since the bandpass of the analog signal is restricted to about 800 Hz, it can be deduced that certain transitions should not occur, and that the observation of the digital signal, or reception, makes it possible to eliminate most of the troublesome parasitic disturbances with abnormal transitions, such as, for example, dark points on a light background. For a predetermined bandpass, there is a threshold S which cannot be exceeded by the sum $|x| + |y|$ when x.y<0.

Experience has taught that in the event n=5, this threshold can be taken equal to 15.

As a final remark, it should be recalled that the signal obtained at the output from the processing system will serve to modulate in amplitude a 1,800 Hz signal so that a classic photo receiver can be utilized. The 1,800 Hz will be subordinated to the master frequency $\phi$ from the modem in order to avoid interference and produce a natural filtering of the modulating signal.

(F) Processing in the case where only three pixels are taken under consideration In this case, the only values considered are then x and y which play a symmetrical role, because if x and y are reversed, it is merely necessary to change the order of the Cj quantities.

In the event that y<0 and x>0, it is sufficient to reverse the order of the Ci quantities and replace x by y in Table II. The output signal will be marked off by the levels corresponding respectively to photo white and photo black.

What is claimed is:

1. Method for the recreation of an analog luminance signal from a digital signal serving for the transmission, after analog-digital conversion, of a luminance signal representative of a document to be transmitted, characterized in that the received signal is processed as a number P of successive pixels and, as a function of their relative and absolute amplitudes, and the central pixel is processed by breaking it down into m sub-pixels having densities that are a function of those of the surrounding pixels, the average value of the density of the initial pixel to be processed is retained and redistributed over the corresponding sub-pixels recreated according to the formula:

$$C = \frac{\sum_{j=1}^{m} Cj}{m}$$

in which:
C represents the absolute amplitude of the central pixel to be created,
Cj represents the amplitude of the sub-pixels created, and
m represents the number of sub-pixels.

2. Method for the recreation of an analog luminance signal from a digital signal serving for the transmission, after analog-digital conversion, of a luminance signal representative of a document to be transmitted, characterized in that, the received signal is processed as a number P of successive pixels and, as a function of their relative and absolute amplitudes, and the central pixel is processed by breaking it down into m sub-pixels having densities that are a function of those of the surrounding pixels.

3. Method according to claim 2, according to which, on transmission, there is a compression of the data by lin-log conversion, and on reception of the received signal, a reverse, log-lin conversion, characterized in that the received signal is processed before the log-lin conversion at the receiving end.

4. Method according to claim 2 or 3, characterized in that the average value of the density of the initial pixel to be processed is retained and redistributed over the corresponding sub-pixels recreated according to the formula:

$$C = \frac{\sum_{j=1}^{m} Cj}{m}$$

in which:
C represents the absolute amplitude of the central pixel to be created,
Cj represents the amplitude of the sub-pixels created,
m represents the number of sub-pixels.

5. The method of claim 2 or 1 characterized in that the received signal is converted from digital to analog form before the received signal is processed.

6. The method of claim 2 or 1 characterized in that the received signal is converted from digital to analog form after the received signal is processed.

7. Method according to claim 2 or 3 or 1, characterized in that the number of pixels is at least equal to three, namely the pixel P to be processed, the preceding pixel P−1 and the following pixel P+1, pixel P forming a quantization gap x relative to pixel P−1 and a quantization gap y relative to pixel P+1, and in that the quantization of the sub-pixels created for the processing of pixel P is as follows:
  if the product x·y is equal to zero, the values of the amplitudes Cj of the sub-pixels are unchanged and remain equal to the absolute amplitude of pixel P to be processed;
  if the product x·y is positive, the values of the amplitudes Cj of the sub-pixels are computed so as to insure a stepped transition between pixels P−1 and P+1, the slope of which varies as a function of the gap between values x and y;
  if the product x·y is negative, the values of the amplitudes Cj of the sub-pixels are computed to ensure a recreation of fine details by a transition exhibiting a maximum or a minimum whereof the form, determined experimentally, varies as a function of the gap between values x and y.

8. Method according to claim 2 or 3 or 1, characterized in that the number of pixels is equal to five, namely the pixel P to be processed, preceded by pixels P−1 and P−2, and followed by pixels P+1 and P+2, pixel P forming a quantization gap x relative to pixel P+1 and a quantization gap y relative to pixel P−1, while pixel P−2 forms a quantization gap alpha with pixel P−1, and pixel P+2, and a quantization gap beta with respect to pixel P+1, and the quantization of the sub-pixels for processing of pixel P is as follows:
  if the quantization gap x is equal to zero, the values of the amplitudes Cj of the sub-pixels are unchanged and remain equal to the absolute amplitude of pixel P to be processed;
  if the quantization gap is different from zero, the processing proceeds are as follows;
  (a) the product x·y is equal to zero;
  if beta x equals zero, the values of the amplitudes Cj of the sub-pixels are unchanged and remain equal to the absolute amplitude of pixel P to be processed except in the event the quantization gap |x| is less than or equal to a predetermined value, the amplitudes Cj varying in this case according to a linear equation of the type, $$Cj = C - \frac{m+1-j}{m+1} x$$

in which,
C is the absolute amplitude of pixel P,
j is the number of the sub-pixel,
m is the number of sub-pixels of pixel P,
  if beta x>0, the values of the amplitudes Cj of the sub-pixels are unchanged and remain equal to the amplitude of pixel P to be processed,
  if beta ·x<0 the values of the amplitudes Cj of the sub-pixels are computed so as to ensure a recreation of fine details for pixels P and P+1 simultaneously, as this is a case of double points;
  (b) if x·y is negative, the values of the amplitudes Cj of the sub-pixels are computed to ensure a recreation of fine details for pixel P and possibly for pixels P and P+1;
  if x·y is positive, the values of the amplitudes Cj of the sub-pixel, are computed to ensure a step transition between P−1 and P+1.

9. A method according to claim 8, characterized in that, in order to make a stepped transition between pixel P−1 and pixel P+1, the optimal points of passage $$P_{(bc)} = C + \epsilon_{(bc)}$$

and $$P_{(cd)} = C + \epsilon'_{(cd)}$$

are determined for transitions P−1→P and P→P+1, with $$\epsilon_{(bc)} = - \frac{x|y|}{|y| + |\alpha|}$$

and $$\epsilon'_{(cd)} = - \frac{y|x|}{|x| |\beta|}$$

and the amplitude of all the sub-pixels to be created is determined as a function of the ratio ε(bc)/ε'(cd).

10. Method according to claim 9, characterized in that, to effect a recreation of tine details, the amplitude of the sub-pixels is determined as a function of the values epsilon$_{(bc)}$ and epsilon'$_{(cd)}$, with consideration of the absolute amplitude of pixel P in order to limit the processing to maintain the values of the sub-pixels recreated between the voltages corresponding, respectively, to photo black and photo white.

11. An arrangement for the recreation, after digital transmission of an analog signal such as, for example, the signal from a Belin type analyzer, comprising:
  (a) a transmitter including;

a linear-logarithimic converter (8) receiving the previously demodulated analog signal;

a unit formed by two integrators (10) mounted in parallel at the output of said converter (8) and functioning alternately, to integrate the entirety of the luminance signal delivered by each pixel;

an analog-digital converter (5) coupled to the output of said unit by a blocking sampler (11) which stores the signal furnished by either of said two integrators (8) during the time necessary for the analog-digital conversion relative to each pixel; and a parallel-series interface (12) to serialize the digital signal representing the value of each of the pixels, and transmit it to a multiplexer (13) for transmission over a transmission line (14) according to prevailing standards;

(b) a receiver including;

a series-parallel converter (16) receiving the digital-series signal from the transmission line (14);

a digital-analog converter (21), connected to the output of the series-parallel converter (16);

a computing and processing unit (23) recreating an analog luminance signal from a digital signal, used for transmission and obtained from the converter (21);

a logarithmic-linear converter (22) to process the signal from the computing and processing unit (23) to obtain at its output an exponential signal identical to the demodulated analog signal transmitted at the transmitter.

12. Arrangement according to claim 11, characterized in that, to avoid interferences that result in a watered-silky appearance of the reconstituted document, the modulator (25) is controlled by the clock of modem (13).

13. Arrangement according to claim 11, characterized in that the modulated signal furnished by the transmitter (1), is transmitted to the linear-logarithmic converter (8) by a circuit for demodulation, detection of white (4) and levelling, said demodulation circuit comprising, in series between the transmitter (1) and the linear-logarithmic converter (8), a variable-gain amplifier (2) a double-wave rectifier (7) an¹ a low pass filter (7'), a switching device (9) being provided between the low pass filter (7'), the linear-logarithmic converter (8), and the transmission line (14).

14. Arrangement according to claim 11, characterized in that the transmitter comprises a circuit controlling the switching device (9) to break the connection between the double-wave rectifier and the linear-logarithmic converter in the absence of a transmission from the transmitter.

15. Arrangement according to claim 11, characterized in that the transmitter comprises a circuit which, detects the presence of a white signal transmitted at the start of the transmission (block 4);

adjusts the gain of the variable-gain amplifier (2) such that the variable gain amplifier delivers a signal the amplitude of which is equal to the maximum value that the analog-digital converter can convert;

stores the signal determining the gain of the amplifier (2) such that the gain remains constant throughout the transmission, and, makes the connection between the low pass filter (7') and the linear-logarithmic converter (8) when locking of the gain of the amplifier (2) is completed.

16. Arrangement according to claim 11, characterized in that it comprises a limiter circuit to limit the amplitude of the white level of the readily signal to the previously established white level, in the event the amplitude of the reading signal is higher than that of the white level previously established.

17. Arrangement according to claim 11, characterized in that the transmitter comprises a circuit for generating, after locking of the amplifier gain, and before digital processing of the document, (a) a redundant binary word serving as a synchronization signal to the receiver to enable the receiver to recognize the beginning and the end of a binary word quantizing a pixel (block 6); and (b) a recognition word means which, depending on the code used, will or will not authorize the receiver to receive the message (block 6').

18. Arrangement according to claim 11, characterized in that the receiver also comprises:

a circuit for decoding the recognition word which, depending on the code used, will or will not authorize the receiver to receive the signal transmitted by the line (block 17);

a decoder (18') for the synchronization word which transmits a zero reset signal for the clock piloting the digital-analog converter (21).

19. Arrangement according to claim 11, characterized in that the receiver also comprises an image-detection circuit (27) and a block (27') which shunts the output of converter (22) so that the modulation level of circuit (25) is then at −50 dB.

20. Arrangement according to claim 11, characterized in that the arrangement is embodied in a microprocessor, with the order of processing operations to recreate the signal being modified as follows:

in the receiver, the processing operations performed on the signal are performed before the digital-analog converter; and 21. The arrangement of claim 11 wherein the multiplexer (13) includes a modem.

22. The arrangement of claim 11 wherein the computing and processing unit (23) is connected to the output of the series parallel converter (16) and the digital-analog converter (21) is connected to the output of the computing and processing unit (23).

* * * * *